United States Patent
Kwon et al.

(10) Patent No.: US 7,532,277 B2
(45) Date of Patent: May 12, 2009

(54) LIQUID CRYSTAL DISPLAY DEVICE USING ALIGN MARK

(75) Inventors: Keuk-Sang Kwon, Gyeongsangbuk-Do (KR); Kwang-Soon Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 308 days.

(21) Appl. No.: 11/474,978

(22) Filed: Jun. 27, 2006

(65) Prior Publication Data
US 2006/0290841 A1    Dec. 28, 2006

(30) Foreign Application Priority Data
Jun. 27, 2005    (KR) ...................... 10-2005-0055965

(51) Int. Cl.
*G02F 1/1333* (2006.01)
(52) U.S. Cl. ..................................... 349/110
(58) Field of Classification Search ............... None
See application file for complete search history.

(56) References Cited

U.S. PATENT DOCUMENTS

| | | | |
|---|---|---|---|
| 6,801,275 B2 * | 10/2004 | Lim ........................ | 349/110 |
| 6,839,113 B2 * | 1/2005 | Watanabe et al. .......... | 349/141 |
| 6,927,818 B2 * | 8/2005 | Hinata et al. ............. | 349/114 |
| 2002/0080296 A1 | 6/2002 | Oike et al. | |
| 2004/0263769 A1 | 12/2004 | Lee et al. | |

FOREIGN PATENT DOCUMENTS

JP    05-232513 A    9/1993

* cited by examiner

*Primary Examiner*—Sung H Pak
(74) *Attorney, Agent, or Firm*—McKenna Long & Aldridge LLP (57) ABSTRACT

A liquid crystal display device (LCD) includes an alignment mark in a pixel region. The LCD includes upper and lower substrates; a plurality of gate lines; a plurality of data lines arranged to perpendicularly cross the gate lines on the lower substrate and defining unit pixels together with the gate lines; a switching element at each crossing of the gate lines and the data lines; first and second alignment marks disposed on respective sides of at least one of the gate lines and the data lines; a pixel electrode at each unit pixel; a black matrix on a region of the upper substrate corresponding to a boundary region of the unit pixels; and a liquid crystal layer between the upper and lower substrates. One side of the first alignment mark and one side of the black matrix lie on one straight line, and one side of the second alignment mark and the other side of the black matrix lie on one straight line.

26 Claims, 7 Drawing Sheets

LIQUID CRYSTAL DISPLAY DEVICE USING ALIGN MARK

This application claims the benefit of Korean Patent Application No. 2005-0055965, filed on Jun. 27, 2005, which is hereby incorporated by reference for all purposes as if fully set forth herein.

BACKGROUND OF THE INVENTION

1. Field of the Invention

The present invention relates to a liquid crystal display device (LCD) and, more particularly, to an LCD having an alignment mark in a pixel region.

2. Description of the Related Art

In general, the LCD includes two substrates separated with a certain gap therebetween, liquid crystal inserted between the two substrates, and a plurality of layers formed between the two substrates and liquid crystal.

Alignment marks are formed on the two facing substrates and used as reference points for aligning the two substrates for their attachment. That is, an operator of an alignment process can determine a degree of alignment of the two substrates by recognizing whether the alignment mark patterns on the two substrates are identical or not.

The alignment marks are formed on a non-active region of the substrate on which elements are not formed, and when the aligning process is finished, the non-active region with the alignment marks are cut away to be discarded.

Recently, in order to implement full colors similar to natural colors, there has been a tendency to provide greater integration of the LCD elements to make the element smaller and to increase their density, resulting in gaps between elements being quite narrow.

Thus, even if the alignment is deviated slightly, the corresponding elements may be formed away from their originally intended positions, degrading color reproducibility and yield. Therefore, the aligning is of importance.

The alignment marks of the related art LCD will be described with reference to the accompanying drawings.

Figure 1:
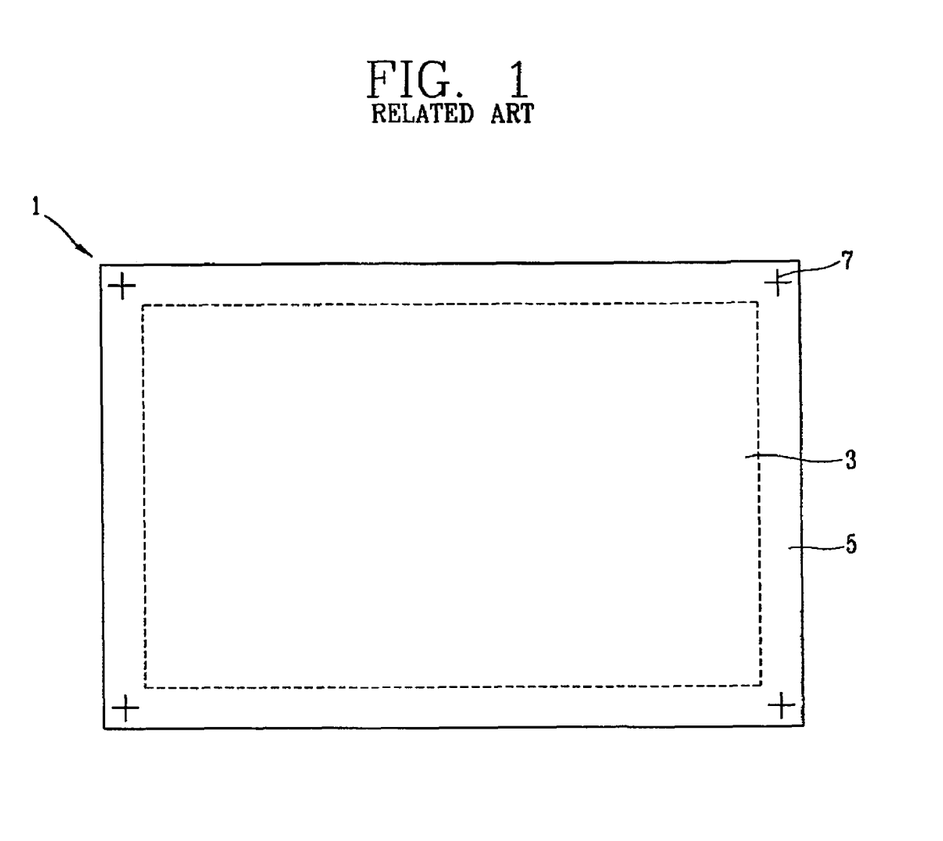
FIG. 1 is a plan view showing alignment marks formed on a substrate of a general liquid crystal display.

FIG. 1 is a plan view showing alignment marks formed on the substrate of the related art LCD. As shown, a substrate 1 can be divided into an active region 3 on which various elements are formed, and a non-active region 5 that can be cut away to be discarded when the processes are completed. Alignment marks 7 in a typical cross shape are formed on four corner portions of the non-active region 5.

The alignment marks are generally formed on the substrate in the early processes of upper and lower substrates, and used when the upper and lower substrates are attached.

When the upper and lower substrates of the LCD are attached with liquid crystal therebetween, the alignment marks of the upper substrate and alignment marks of the lower substrate appear to overlap with each other, so an operator can determine that the upper and lower substrates are properly attached.

In general, the alignment marks are formed on the corner portions of the upper and lower substrates. If two alignment marks are used, they are typically formed on one corner portion and the other diagonally corresponding corner portion. Alternatively, if four alignment marks are used, they can be formed on each corner portion as necessary. In some cases, only one alignment mark can be used and formed on one corner portion.

The alignment marks is too minute to be recognized by the eyes of the operator, so the alignment mark is recognized by using a microscope to determine a degree of alignment of the substrates.

However, the alignment marks of the LCD according to the related art allow merely the overall alignment of substrates, failing to check a precise degree of attachment between lines or elements in an active region, namely, a degree of misalignment.

Actually, during the fabrication process, the LCD undergoes a high temperature process such as a plurality of exposure processes and a testing, and in the processes, the glass substrate may be distorted, leading to distortion of line patterns. Then, the precise degree of alignment between lines or elements can hardly be recognized through only the alignment marks formed on the corner portions of the substrates.

In addition, the internal distortion phenomenon becomes severe as the substrates are increased in size and the lines become more minute and fine.

SUMMARY OF THE INVENTION

Accordingly, the present invention is directed to a liquid crystal display device using an alignment mark that substantially obviates one or more of the problems due to limitations and disadvantages of the related art.

Therefore, an advantage of the present invention is to provide a liquid crystal display device (LCD) capable of accurately discriminating a degree of alignment between highly integrated and minute, fine lines by forming alignment marks in an active region.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided an LCD including: upper and lower substrate; a plurality of gate lines arranged in a horizontal direction on the lower substrate; a plurality of data lines arranged to vertically cross the gate lines on the lower substrate and defining unit pixels together with the gate lines; a plurality of switching elements formed at each crossing of the gate lines and the data lines; first and second alignment marks disposed on both sides of at least one of the gate lines and the data lines; a plurality of pixel electrodes formed at each unit pixel; black matrixes formed on a region of the upper substrate corresponding to a boundary region of the unit pixels; and a liquid crystal layer formed between the upper and lower substrates.

In another aspect of the present invention an LCD includes: upper and lower substrate; a plurality of gate lines arranged in a horizontal direction on the lower substrate; a plurality of data lines arranged to vertically cross the gate lines on the lower substrate and defining unit pixels together with the gate lines; a plurality of switching elements formed at each crossing of the gate lines and the data lines; first and second alignment marks disposed on both sides the gate lines; a plurality of pixel electrodes formed at each unit pixel; black matrixes formed on a region of the upper substrate corresponding to a boundary region of the unit pixels; and a liquid crystal layer formed between the upper and lower substrates.

In another aspect of the present invention, an LCD includes upper and lower substrate; a plurality of gate lines arranged in a horizontal direction on the lower substrate; a plurality of data lines arranged to vertically cross the gate lines on the lower substrate and defining unit pixels together with the gate lines; a plurality of switching elements formed at each crossing of the gate lines and the data lines; first and second alignment marks disposed on both sides the data lines; a plurality of pixel electrodes formed at each unit pixel; black matrixes formed on a region of the upper substrate corresponding to a boundary region of the unit pixels; and a liquid crystal layer formed between the upper and lower substrates.

In another aspect of the present invention, a method for fabricating an LCD includes providing upper and lower substrate; forming a plurality of gate lines in a horizontal direction on the lower substrate; forming a plurality of data lines arranged to vertically cross the gate lines on the lower substrate and defining unit pixels together with the gate lines; forming a plurality of switching elements at each crossing of the gate lines and the data lines; forming first and second alignment marks on at least one side of the gate lines and the data lines; forming a plurality of pixel electrodes at each unit pixel; forming black matrixes on a region of the upper substrate corresponding to a boundary region of the unit pixels; and forming a liquid crystal layer between the upper and lower substrates.

In another aspect of the present invention, a method for fabricating an LCD includes providing upper and lower substrate; forming a plurality of gate lines in a horizontal direction on the lower substrate; forming a plurality of data lines arranged to vertically cross the gate lines on the lower substrate and defining unit pixels together with the gate lines; forming a plurality of switching elements at each crossing of the gate lines and the data lines; forming first and second alignment marks on both sides of the gate lines; forming a plurality of pixel electrodes at each unit pixel; forming black matrixes on a region of the upper substrate corresponding to a boundary region of the unit pixels; and forming a liquid crystal layer between the upper and lower substrates.

In another aspect of the present invention, a method for fabricating an LCD includes providing upper and lower substrate; forming a plurality of gate lines in a horizontal direction on the lower substrate; forming a plurality of data lines arranged to vertically cross the gate lines on the lower substrate and defining unit pixels together with the gate lines; forming a plurality of switching elements at each crossing of the gate lines and the data lines; forming first and second alignment marks on both sides of the data lines; forming a plurality of pixel electrodes at each unit pixel; forming black matrixes on a region of the upper substrate corresponding to a boundary region of the unit pixels; and forming a liquid crystal layer between the upper and lower substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to an embodiment of the present invention, example of which is illustrated in the accompanying drawings.

Figure 2:
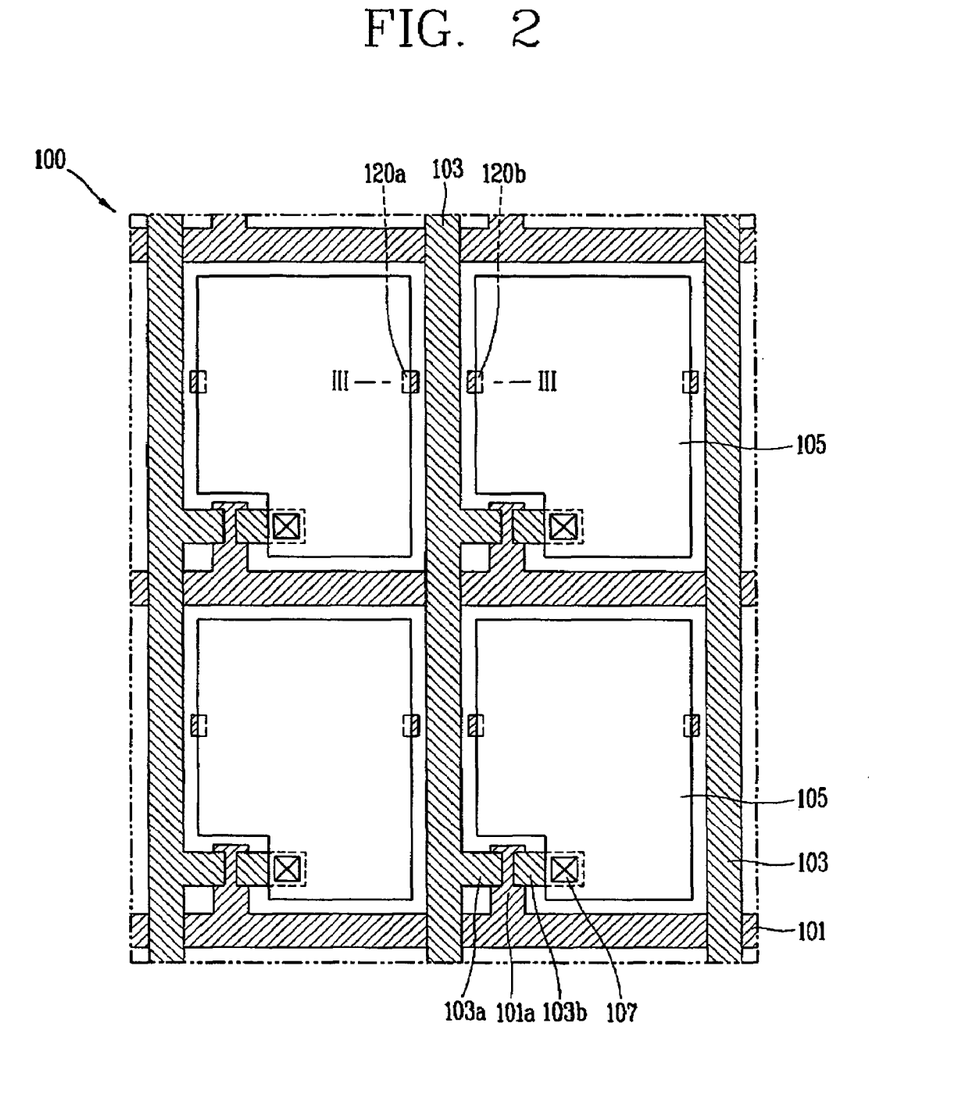
FIG. 2 is a plan view illustrating an LCD according to a first embodiment of the present invention.
Figure 3A:
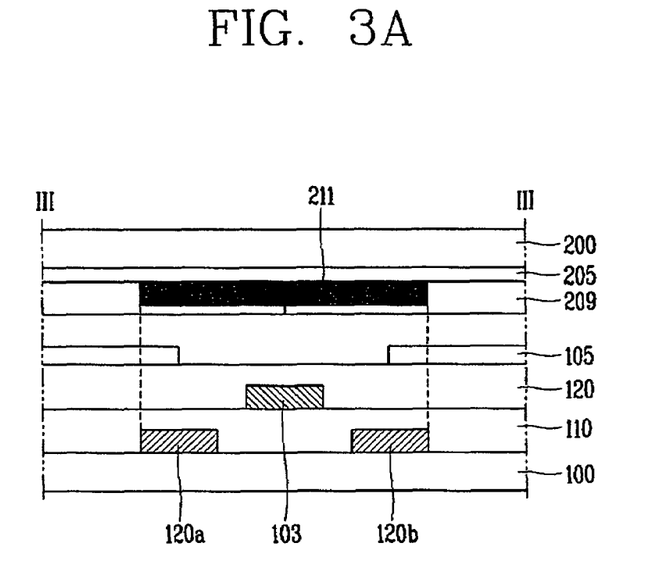
FIG. 3A is a sectional view taken along line III-III in FIG. 2 illustrating an LCD according to the first embodiment of the present invention.
Figure 3B:
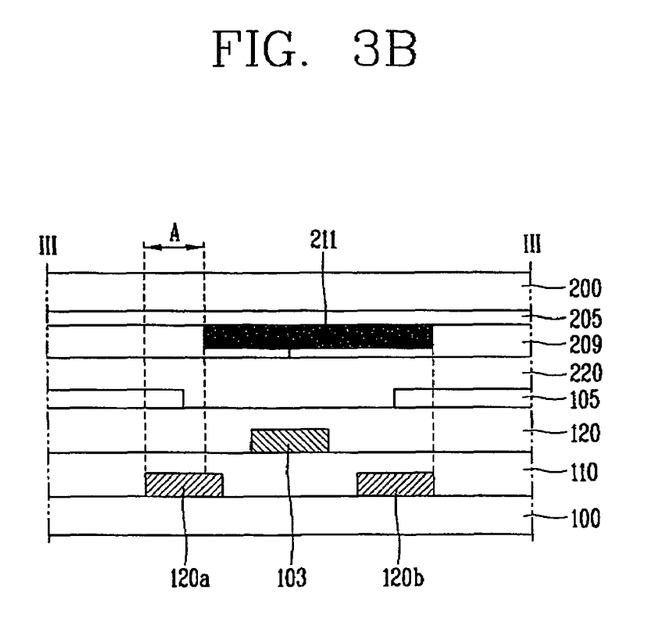
FIG. 3B is a sectional view illustrating an example of the generation of mis-alignment between a boundary region of a unit pixel and a black matrix in an active region of the LCD according to the first embodiment of the present invention.

FIG. 2 is a plan view illustrating an LCD according to a first embodiment of the present invention; FIG. 3A is a sectional view taken along line III-III in FIG. 2 illustrating the LCD according to the first embodiment of the present invention; and FIG. 3B is a sectional view for explaining generation of mis-alignment between a boundary region of a unit pixel and a black matrix in an active region of the LCD according to the first embodiment of the present invention.

As illustrated, the LCD according to the present invention includes an array substrate, for example, a lower substrate 100, a color filter substrate, for example, an upper substrate 200, and a liquid crystal layer (not shown) formed between the upper and lower substrates 100 and 200.

On the lower substrate 100, a plurality of gate lines 101 are arranged to cross a plurality of data lines 103 substantially perpendicularly to define unit pixels.

Switching elements, for example, a thin film transistors (TFTs), for switching the unit pixels are formed at crossings of the gate lines 101 and the data lines 103. Each switching element includes a gate electrode 101a formed by extending a portion of the gate line 101, a gate insulation film 110 formed on an upper portion of the gate electrode 101a, a source electrode 103a formed by extending a portion of the data line 103 on the gate insulation film 110, and a drain electrode 103b separated by a certain interval from the source electrode 103a.

The switching element further includes a semiconductor layer (not shown) and an ohmic contact layer (not shown) for forming a conductive channel between the source electrode 103a and the drain electrode 130b.

The switching elements selectively provide data signals from the data lines 103 to the unit pixels in response to gate signals from the gate lines 101.

A pixel electrode 105 for receiving the data signals from the switching elements are formed in each unit pixel.

The pixel electrodes 105 are positioned in a cell region sectioned by the data lines 103 and the gate lines, and are made of a transparent conductive material with high light transmittance such as ITO (Indium Tin Oxide), IZO (Indium Zinc Oxide), ITZO (indium Tin Zinc Oxide) or TO (Tin Oxide), etc.

The pixel electrode 105 is formed on a passivation film 120 coated on the entire surface of the array substrate 100, and may be electrically connected with the drain electrode 103b through a contact hole 107 penetrating the passivation film 120.

The pixel electrode 105 generates a potential difference with a common electrode 105 formed on the upper substrate 200 by the data signal supplied by way of the switching element.

Liquid crystals positioned between the lower an upper substrates 100 and 200 are rotated according to dielectric constant anisotropy by the potential difference.

The amount of light transmitted toward the upper substrate 200 by way of the pixel electrode 105 from a light source is controlled by rotation of the liquid crystals, to thereby allow displaying of images.

In addition to the common electrode 205, color filters 209 for implementing red, green and blue colors are formed on the upper substrate 200. Each color filer 209 transmits one of red, green and blue colors, and absorbs light of the other wavelength band to display a desired color.

Black matrixes 211 are formed at a region corresponding to a boundary region of unit pixels to prevent light leakage.

At least one of first and second alignment marks 120a and 120b is formed at left and right sides of the data line 103 formed at the upper portion of the lower substrate 100.

The first and second alignment marks 120a and 120b may be formed on the same layer on which the gate line 101 is formed through the same masking process. In this example, the first and second alignment marks 120a and 120b are formed in an island type. That is, the alignment marks 120a and 120b are not electrically connected any wire (line), so that they cannot have any influence on a pixel voltage. Alternatively, the alignment marks may be formed of a non-conductive material.

As illustrated in FIG. 3A, one side of the first alignment mark 120a and one side of the black matrix 211 may align along the same straight line, and one side of the second alignment mark 120b and the other side of the black matrix 211 may align along the same straight line.

Namely, the black matrix 211 is formed at an upper portion including the data line 103 and the first and second alignment marks 120a and 120b, and in this case, the left side of the black matrix 211 and the left side of the first alignment mark 120 are positioned to follow the same straight line and the right side of the black matrix 211 and the right side of the second alignment mark 120b are positioned to follow the same straight line.

Accordingly, when the upper and lower substrates 200 and 100 are precisely aligned and attached, the first and second alignment marks 120a and 120b on the lower substrate 100 each overlap with the black matrix 211 of the upper substrate 200 from a top view, so the first and second alignment marks 120a and 120b are not observed by an operator. Namely, when the upper and lower substrates 200 and 100 are precisely aligned and attached and the wiring in the active region is accurately patterned according to design, the black matrix 211 of the upper substrate 200 and the first and second alignment marks 120a and 120b of the lower substrate 100 are matched, so the first and second alignment marks 120a and 120b of the lower substrate are not observed.

Accordingly, the alignment state of the upper and lower substrates 200 and 100 and the position of the wiring pattern can be accurately checked.

If, however, the alignment of the upper and lower substrates 200 and 100 are distorted or the wiring is not accurately patterned according to designing, the first or the second alignment mark 120a or 120b would not overlap the black matrix and would be outside of the region where light is blocked by the black matrix 211. Thus, the alignment mark would be observed by the operator. Accordingly, in the aligning process for attaching the upper and lower substrates 200 and 100, the operator can easily recognize whether the two substrates 200 and 100 have been precisely aligned, whether and how much they are shifted in one direction, and especially, which wiring has been shifted and in what direction.

FIG. 3B illustrates an example of mis-alignment generated between the boundary region of the unit pixel and the black matrix 211 in the active region. As shown, when the wiring of the lower substrate 100, e.g., the data line 103, the first and second alignment marks 120a and 120b, and the pixel electrode 105 are shifted to the left relative to the black matrix 211 of the upper substrate 200, a portion 'A' of the first alignment mark 120a is outside of the region in which light is blocked by the black matrix 211 and thus observed by the operator.

If the two substrates 200 and 100 and the wirings are out of a tolerance range of attachment, light would be leaked, so desired picture quality cannot be obtained when the liquid crystal cells are driven.

Thus, by disposing the first and second alignment marks 120a in the active region, namely, in the unit pixel, the attachment degree between the upper and lower substrates 200 and 100 and the alignment degree between the highly integrated and minute wirings can be accurately discriminated.

Figure 6:
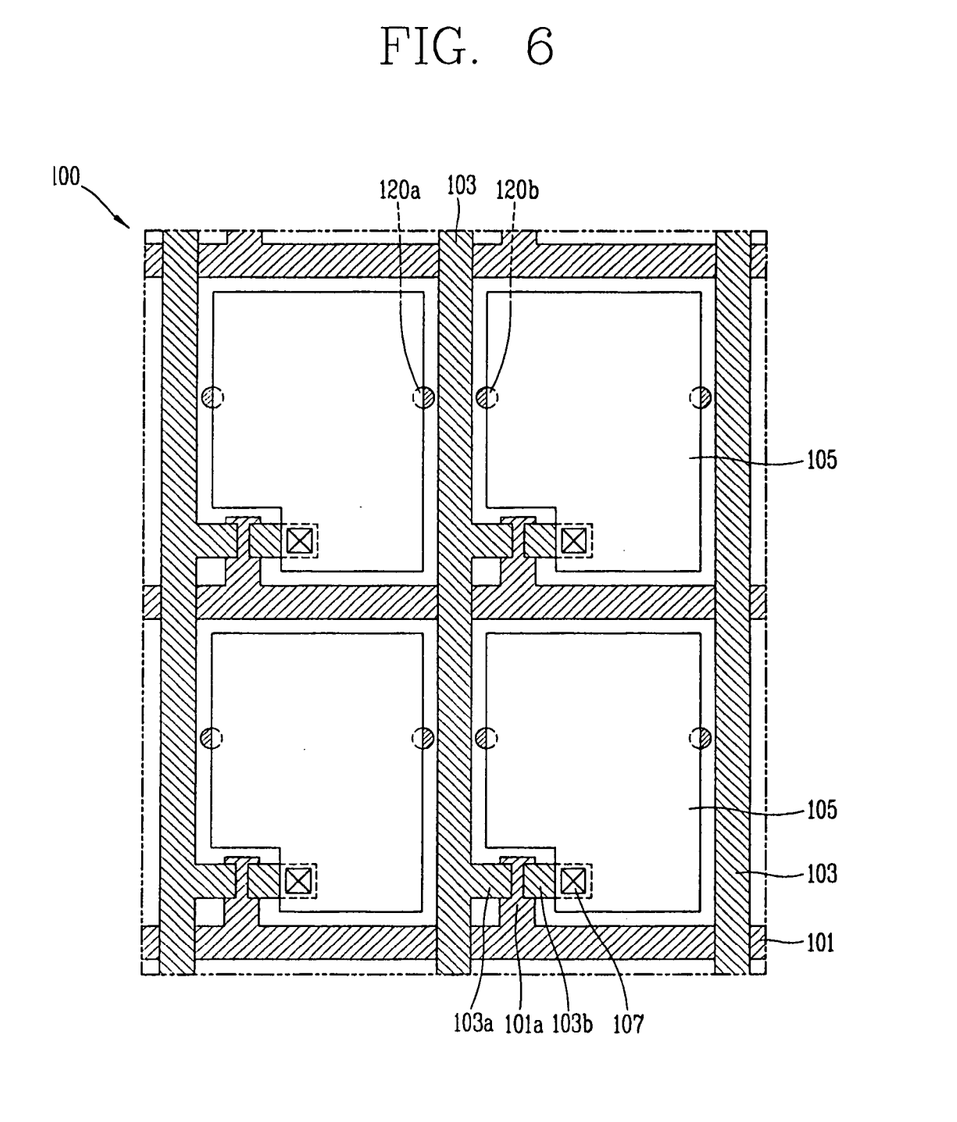
FIG. 6 is a plan view illustrating an LCD according to a first embodiment of the present invention in which the alignment marks have a circular shape.

The first and second alignment marks 120a and 120b can be formed in any shape. Although the first and second alignment marks 120a and 120b in the illustrative drawing have a square shape, they can be formed in a triangular shape or circular shape (as shown in FIG. 6) such that an alignment can be accurately checked by unit pixels and a defect resulting from the attachment relation such as a light leakage can be prevented or minimized.

Figure 7:
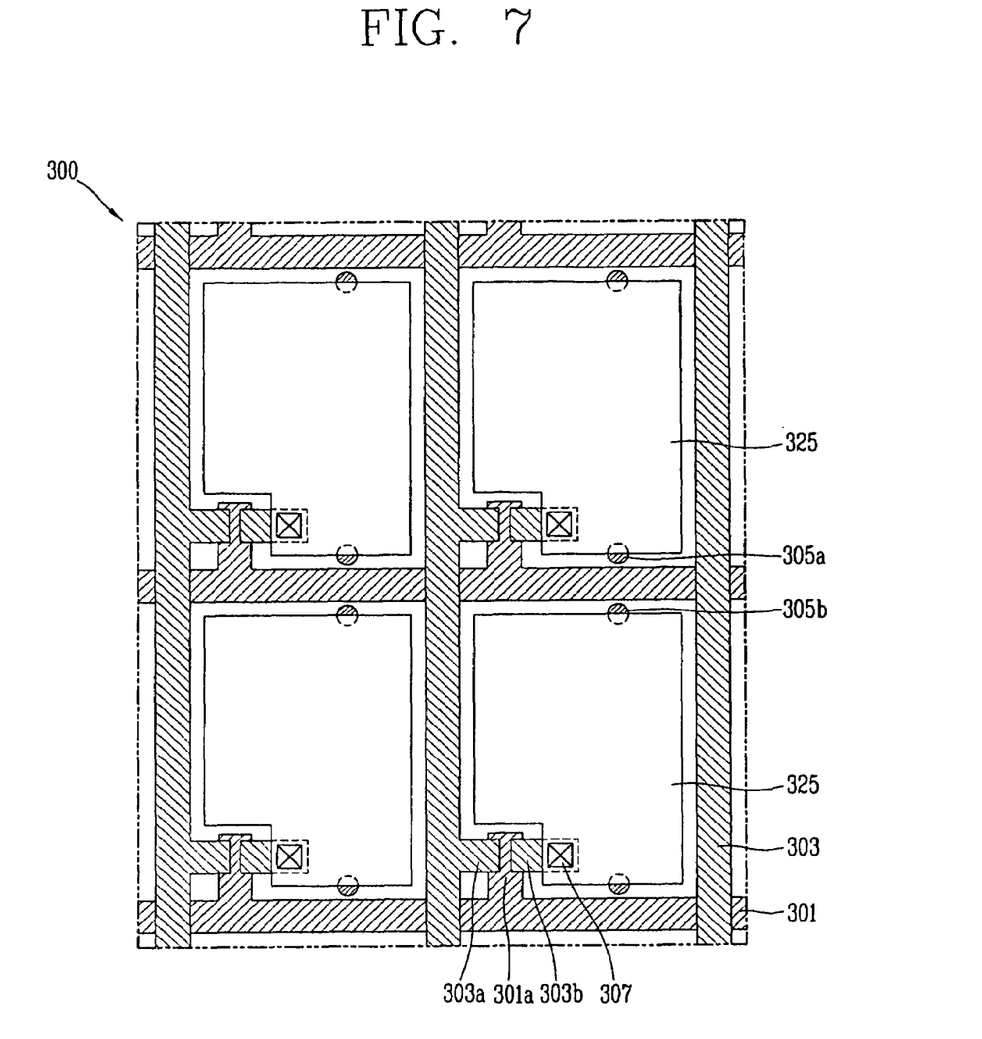
FIG. 7 is a plan view illustrating an LCD according to a second embodiment of the present invention in which the alignment marks have a circular shape.

An LCD and its fabrication method according to a different embodiment of the present invention will now be described with reference to FIGS. 4, 5 and 7.

Figure 4:
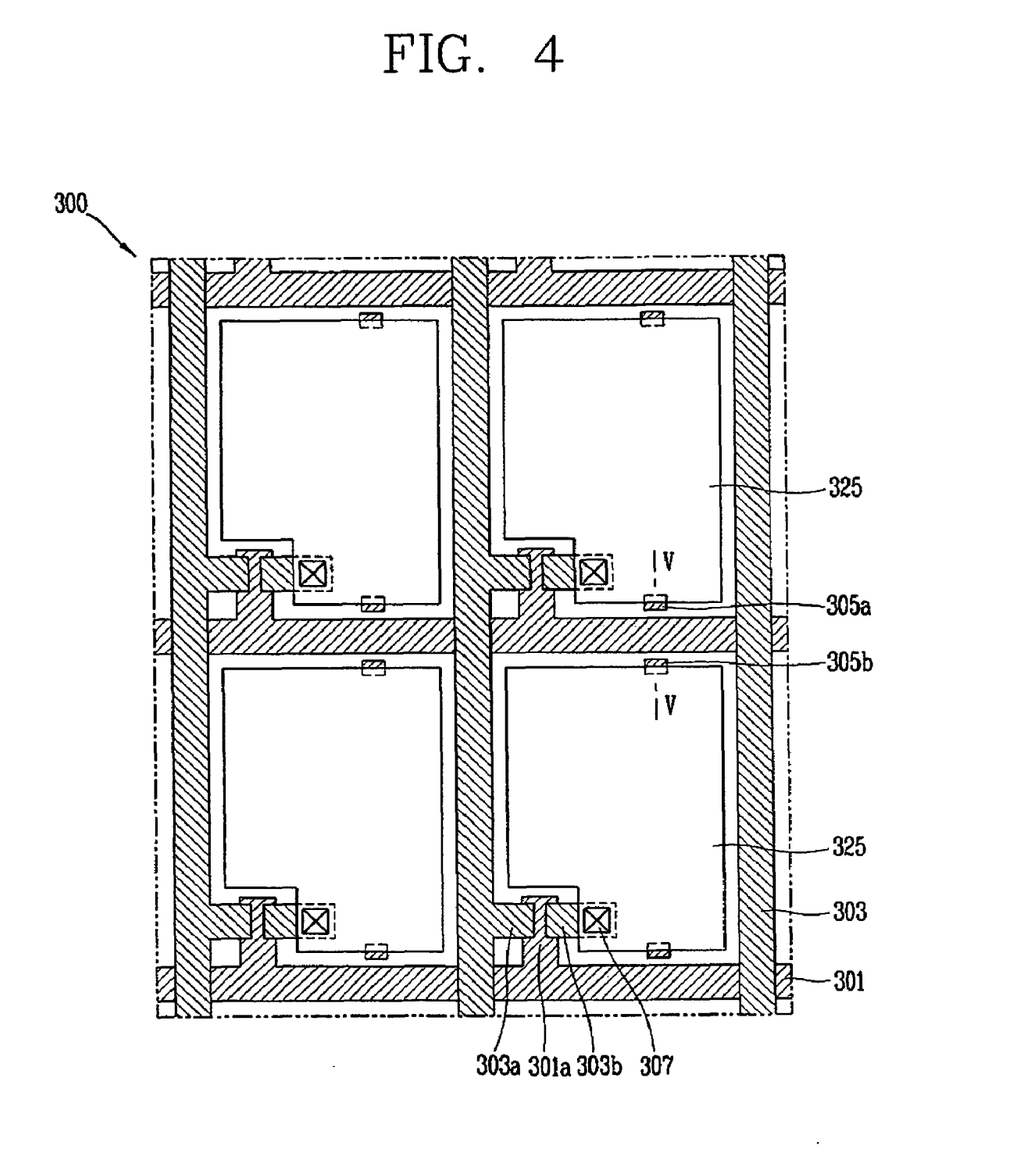
FIG. 4 is a plan view illustrating an LCD according to a second embodiment of the present invention.
Figure 5:
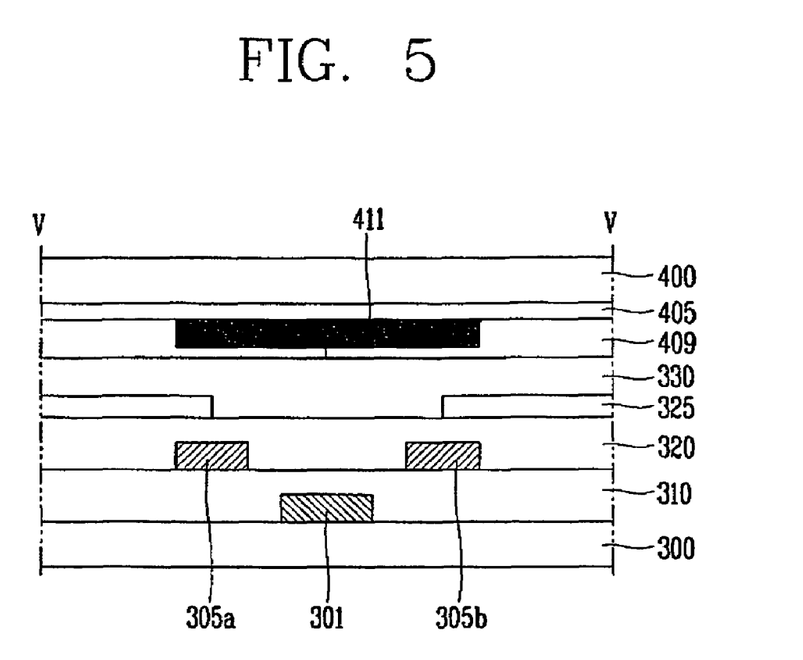
FIG. 5 is a sectional view taken along line V-V in FIG. 4 illustrating the LCD according to the second embodiment of the present invention.

FIG. 4 is a plan view illustrating an LCD according to a second embodiment of the present invention; and FIG. 5 is a sectional view taken along line V-V in FIG. 4 illustrating the LCD according to the second embodiment of the present invention.

The construction of the second embodiment of the present invention is similar to that of the first embodiment of the present invention, so details different from the first embodiment will be described.

As illustrated in this embodiment of the present invention, third and fourth alignment marks 305a and 305b are formed at upper and lower sides of each gate line 301.

The third and fourth alignment marks 305a and 305b may be formed on the same layer on which a data line 403 is formed through the same masking process. In this example, the third and fourth alignment marks 305a and 305b are formed in an island type such that they which are not electrically connected any wire (line), so that they cannot have any influence on a pixel voltage. Alternatively, the alignment marks may be formed of a non-conductive material.

One side of the third alignment mark 305a and one side of the black matrix 411 fall along the same straight line, and one side of the fourth alignment mark 305b and the other side of the black matrix 411 fall along the same straight line.

Accordingly, when the upper and lower substrates 400 and 300 are precisely aligned and attached, the third and fourth alignment marks 305a and 305b of the lower substrate 100 each overlap with the black matrix of the upper substrate from a top view so that the third and fourth alignment marks 305a and 305b are not observed by an operator. Namely, when the upper and lower substrates 400 and 300 are precisely aligned and attached and the wiring in the active region is accurately patterned according to design, the black matrix 411 of the upper substrate 400 and the third and fourth alignment marks 305a and 305b of the lower substrate 300 are matched, so that the third and fourth alignment marks 305a and 305b of the lower substrate are not observed.

Accordingly, the alignment state of the upper and lower substrates 400 and 300 and the position of the wiring pattern can be accurately checked.

If, however, the alignment of the upper and lower substrates 400 and 300 are distorted or the wiring is not accurately patterned according to design, the third and fourth alignment marks 305a and 305b would be outside of the region in which light is blocked by the black matrix 411 and thus observed by the operator. Accordingly, in the aligning process for attaching the upper and lower substrates 400 and 300, the operator can easily recognize whether the two substrates 400 and 300 have been precisely aligned, whether and how much they are shifted in one direction, and especially, which wiring has been shifted and in what direction.

As a result, by forming the alignment marks in the active region in the LCD according to the present invention, the accurate position information of the wiring can be obtained, a cause of deficiency can be can be recognized in real time, and accordingly, the processing time can be shortened and a process related to the cause of a defect can be improved.

As so far described, the LCD having the alignment marks in the pixel region and its fabrication method according to the present invention have the following advantages.

That is, whether alignment is defective or not can be accurately checked by unit pixels, so a defect resulting from the attachment relation such as a light leakage can be prevented.

In addition, since a cause of a defect can be detected almost in real time, the process time can be shortened and thus the productivity of the LCD can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device (LCD), comprising:
   upper and lower substrate;
   a plurality of gate lines on the lower substrate;
   a plurality of data lines crossing the gate lines substantially perpendicularly on the lower substrate and defining unit pixels together with the gate lines;
   a switching element at each crossing of the gate lines and the data lines;
   first and second alignment marks disposed on respective sides of at least one gate line;
   a pixel electrode at each unit pixel;
   a black matrix on a region of the upper substrate corresponding to a boundary region of the unit pixel; and
   a liquid crystal layer between the upper and lower substrates.

2. The LCD of claim 1, wherein the first and second alignment marks are disposed at respective sides of at least one data line.

3. The LCD of claim 1, wherein the first and second alignment marks overlap with the black matrix.

4. The LCD of claim 1, wherein the first and second alignment marks are separated by a certain interval from the at least one gate line.

5. The LCD of claim 2 wherein the first and second alignment marks are separated by a certain interval from the at least one data line.

6. The LCD of claim 1, wherein the first and second alignment marks are a rectangular shape.

7. The LCD of claim 1, wherein the first and second alignment marks are in a circular shape.

8. The LCD of claim 1, wherein the first and second alignment marks are on the same layer on which the gate line is formed.

9. The LCD of claim 1, wherein the first and second alignment marks are electrically isolated.

10. The LCD of claim 1, wherein the first and second alignment marks are disposed in each different unit pixel region.

11. A liquid crystal display device (LCD), comprising:
    upper and lower substrates;
    a plurality of gate lines on the lower substrate;
    a plurality of data lines crossing the gate lines substantially perpendicularly on the lower substrate and defining unit pixels together with the gate lines;
    a switching element at each crossing of the gate lines and the data lines;
    first and second alignment marks disposed on respective sides of at least one gate line;
    a pixel electrode at each unit pixel;
    a black matrix on a region of the upper substrate corresponding to a boundary region of the unit pixels; and
    a liquid crystal layer between the upper and lower substrates.

12. The LCD of claim 11, wherein the first and second alignment marks overlap with the black matrix.

13. The LCD of claim 11, wherein the first and second alignment marks are separated by a certain interval from at least one of the gate line and the data line.

14. The LCD of claim 11, wherein the first and second alignment marks are in a rectangular shape.

15. The LCD of claim 11, wherein the first and second alignment marks are in a circular shape.

16. The LCD of claim 11, wherein the first and second alignment marks are on the same layer on which the gate line is formed.

17. The LCD of claim 11, wherein the first and second alignment marks are electrically isolated.

18. The LCD of claim 11, wherein the first and second alignment marks are disposed in each different unit pixel region.

19. A liquid crystal display device (LCD), comprising:
    upper and lower substrates;
    a plurality of gate lines on the lower substrate;
    a plurality of data lines crossing the gate lines substantially perpendicularly on the lower substrate and defining unit pixels together with the gate lines;
    a switching element at each crossing of the gate lines and the data lines;
    first and second alignment marks disposed on respective sides of at least one date line;
    a pixel electrode at each unit pixel;
    a black matrix on a region of the upper substrate corresponding to a boundary region of the unit pixels; and
    a liquid crystal layer between the upper and lower substrates.

20. The LCD of claim 19, wherein the first and second alignment marks overlap with the black matrix.

21. The LCD of claim 19, wherein the first and second alignment marks are separated by a certain interval from at least one of the gate line and the data line.

22. The LCD of claim 19, wherein the first and second alignment marks are in a rectangular shape.

23. The LCD of claim 19, wherein the first and second alignment marks are in a circular shape.

24. The LCD of claim 19, wherein the first and second alignment marks are on the same layer on which the gate line is formed.

25. The LCD of claim 16, wherein the first and second alignment marks are electrically isolated.

26. The LCD of claim 17, wherein the first and second alignment marks are in each different unit pixel region.

* * * * *